United States Patent
Tegholm

[11] 3,775,749
[45] Nov. 27, 1973

[54] DEVICE FOR MEASURING SEISMIC SIGNALS

[75] Inventor: Ruben Tegholm, Johanneshov, Sweden

[73] Assignee: Atlas Copco Aktiebolag, Nacka, Sweden

[22] Filed: Sept. 14, 1970

[21] Appl. No.: 72,134

Related U.S. Application Data

[63] Continuation of Ser. No. 795,803, Feb. 3, 1969, abandoned.

[30] Foreign Application Priority Data

Feb. 2, 1968  Sweden.............................. 1417/68

[52] U.S. Cl...... 340/15.5 GC, 330/109, 340/15.5 F, 340/15.5 R
[51] Int. Cl............................................... G01v 1/18
[58] Field of Search............ 340/15.5 GC, 15.5 CF, 340/15.5 IF; 330/109

[56] References Cited
UNITED STATES PATENTS

| | | | |
|---|---|---|---|
| 3,364,462 | 1/1968 | Bogs et al. .......................... | 340/15.5 |
| 2,979,692 | 4/1961 | Grannemann et al....... | 340/15.5 GC |
| 3,286,228 | 11/1966 | Anstey ......................... | 340/15.5 GC |

Primary Examiner—Benjamin A. Borchelt
Assistant Examiner—H. A. Birmiel
Attorney—Eric Y. Munson

[57] ABSTRACT

A device for measuring seismic signals includes a transducer for generating electric signals representative of seismic ground motion, a variable-gain amplifier for amplifying the signals, a recorder for recording the output signal from the amplifier and a control device including an amplifier and rectifier which receives the output signal and generates, in response thereto, a gain-control signal, the magnitude of which varies with respect to the frequency of the output signal such that the gain of the amplifier and the voltage applied to the recorder decreases with increasing frequency of the signals.

4 Claims, 6 Drawing Figures

PATENTED NOV 27 1973 3,775,749

INVENTOR: RUBEN TEGHOLT

Attorney: ERIC Y. MUNSON

DEVICE FOR MEASURING SEISMIC SIGNALS

This is a continuation of copending application, Ser. No. 795,803 filed Feb. 3, 1969, now abandoned.

FIELD OF THE INVENTION

The present invention relates to a device for measuring seismic signals.

DESCRIPTION OF THE PRIOR ART

In seismic surveying by refraction or reflection measurement of ground-motion waves, the propagating time of a pressure wave from a source thereof to one or more measuring points is usually measured. In such measurement, a ground-motion wave originating from a source of accoustic energy, usually a detonated charge of an explosive, may have travelled through or been reflected by ground layers having different seismic characteristics, the depths to the different layers being calculated from measured propagation times of the pressure waves received at different measuring points. The pressure waves thus initiated by detonating an explosive or by mechanical means, such as for instance the impact of a falling weight, are then measured by means of a number of seismometers, that is, transducers converting the received pressure pulses into electric pulses which are then amplified in a corresponding number of amplifiers to provide a recording of the time between the initiation of the charge and the arrival of the signals to the respective transducers, and, as the case may be, the shape of the pressure waves.

The most accurate measuring results are obtained by recording the course of events on a photographic film or other recording means providing a corresponding recording, to make possible an accurate analysis of interference signal level and signals, i.e. local ground disturbances at the particular measuring point, and recorded amplitude originating from detonating the charge used for the measurement.

In such measurement, the gain of each amplifier channel pertaining to a particular transducer is to be set to an accurately selected value prior to detonating a charge to insure an accurate evaluation of recorded waves originating from the impact and received by the particular transducer. With a low gain, difficulty arises in the interpretation of the recorded signals, while, with too high a gain, the local ground agitation at the measuring point in question and present prior to and during arrival at the tranducer of the signals to be measured cause amplitudes which make the interpretation of the recording difficult and inaccurate. Further, the quantity of explosive charge has to be selected with due attention paid to the local seismic situation, such as depths to layers to be investigated, as well as to the local interference signal level.

Due to the fact that the local interference level at a particular measuring point may vary considerably from time to time in amplitude as well as in frequency, it has proved difficult to manually set the gain to a level suitable for the measurement, in particular so if a simultaneous measurement is to be effected with a plurality of seismometers. Therefore, the gain of each amplifier channel has usually been set while considering the largest interfering ground agitation present prior to firing a charge, the quantity of explosive being then selected with respect to a selected gain. Consequently, it has been necessary to use large quantities of explosive when measuring at locations showing a comparatively high interfering ground agitation to compensate for a comparatively low gain selected with respect to such ground agitation.

In view of the fact that the amplitudes of the ground waves when firing a charge increase as the square root of the charge only, this method proves disadvantageous from many points of view, such as cost of the measurement, destruction of soil, and inconveniences when measuring within populated areas.

It is well-known, in seismic reflection measurements, to make use of automatic-gain-control when amplifying the signals from the seismometer transducers. In this way it has been made possible to evaluate amplitudes of the received signals even when the ratio between amplitudes of the waves along the ground surface from the location of the charge to the transducer located closest to the charge, and waves reflected from deep layers and having a depth of, for instance, in the order of 1–10 km, are in the order of $10^5:1$ while measuring.

In seismic refraction measuring, however, and measuring small depths of the order of 0–100 m down to rock in particular, the first arriving impulse only is usually of interest and thus interpreted, while subsequent wave trains are not of the same large interest as in reflection measuring. To make possible the use of a large maximum gain, it would seem obvious also in refraction measurements to make use of an automatic-gain-control, which automatically sets the gain so as to provide a record of the ground agitation as a substantially constant amplitude prior to the arrival of the pulses of interest for the measurement. However, the use of an automatic-gain-control in generally the same manner as for controlling the amplitude of signals received during a reflection measurement proves to result in recordings, the interpretation and evaluation of which is very elaborate and uncertain.

Thus, the automatic-gain-control used with reflection seismic recording has, for instance, been accounted for when evaluating a recording recorded by use of automatic-gain-control, by reproducing the recorded signal to determine the gain used when recording it, to make possible a desired interpretation accuracy of the recording.

In refraction measurements, however, and in particular in refraction measurements at comparatively small depth, such as for instance 1–10 m, an exact measurement of the pulse first arriving at a seismometric transducer is, as mentioned, of primary interest, and due to the fact that this type of measurement is often effected within settlements and densely populated areas, in which the interfering seismic agitation is normally very high and radically changing from time to time, it is highly important to be able to obtain an accurate recording by use of explosive charges which are as small as possible.

SUMMARY OF THE INVENTION

It is an object of the present invention to provide a new and improved device, in which an automatic-gain-control is so arranged that it brings great advantage also in refraction measuring to improve the interpretation of the signal recording.

A further object of the invention is to provide a seismic measuring device for determining, with high accuracy, the time of arrival of an impact ground wave, irrespective of the predominating frequency of the interfering ground agitation caused by other sources than the explosion wave to be measured.

Thus, to understand the invention it is important to recognize that a major object of the invention is to provide a device creating a recording of received seismic signals in which, on arrival of a pressure wave signal to be measured, a sharply marked deviation from a theretofore recorded ground agitation wave is obtained.

BRIEF DESCRIPTION OF THE DRAWING

The foregoing objects of the invention will be better understood from the following description, by reference to the accompanying drawing, illustrating a typical embodiment of the invention. In the drawing.

By way of example, FIG. 1 shows a recording of three signals originating from seismometric transducers located at different distances from an impact wave source, and as recorded after each having passed a circuit, individual to the respective transducers, having frequency response features in accordance with the invention. The portions 1, 2, and 3, up to the times 4, 5 and 6, respectively, show the respective ground disturbances which have been present prior to the arrival of an impact wave to be measured at a first, a second, and a third measuring point, 7, 8, and 9 in FIG. 2, respectively, at successively larger distances from a source of the impact.

As illustrated, the ground disturbance interference wave at the respective measuring points has, as is generally the case, a radically different predominant frequency. The graph illustrates signal amplitudes as recorded by an instrument after the signal from each one of the transducers 7, 8, and 9 has passed an amplifying device with features according to the invention, an embodiment of such a device being exemplified in FIG. 2 as connected to one of the transducers. Wave pulses originating from a shot and received by the respective transducers arrive at the individual recording member of the recording instrument at the times 4, 5, and 6, respectively.

Figure 1:
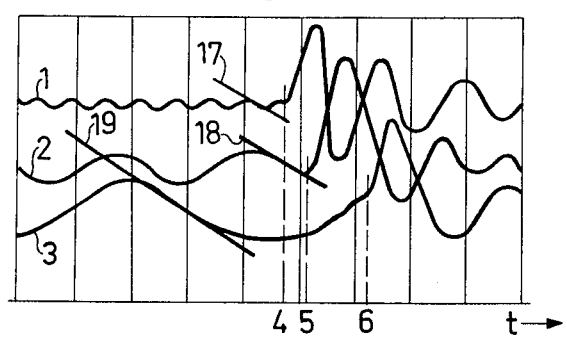
FIG. 1 is a graph representing a recorded seismogram and showing amplitude variations of the recorded output signal of devices according to the invention, which, during the measurement, receive ground wave signals from three seismometric transducers arranged at different distances from an impact wave source and at points showing different and, as the case may be, varying predominant ground disturbance frequencies.
Figure 2:
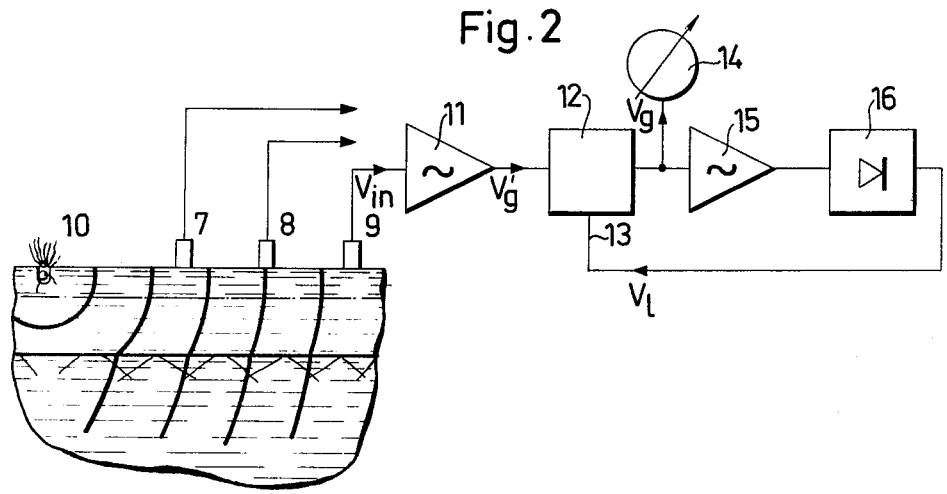
FIG. 2 is a block circuit diagram of an embodiment of the invention for determining the arrival of an impact wave.

FIG. 2 thus illustrates an arrangement of three transducers, seismometers 7, 8 and 9, at different distances from an explosive charge 10, and an amplifier-recording-channel, the input of which is connected to seismometer 9 and the output of which is connected to an individual recording member 14 of the recording instrument to provide a recording according to FIG. 1. Similar channels are included between seismometers 7 and 8, respectively, and corresponding recording means of the recording instrument.

Figure 3:
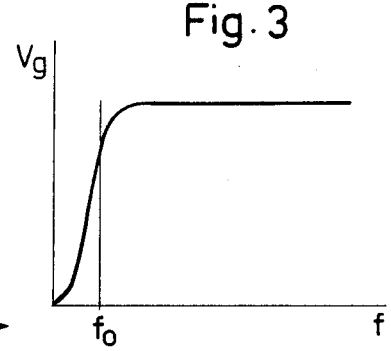
FIG. 3 is a graph showing a frequency response curve of a preamplifier constituting part of the embodiment of the invention as illustrated, and amplifying the electric signals generated by a transducer in response to seismic waves.

Each seismometer is connected to a preamplifier. For example, FIG. 2 shows a seismometer 9 connected to a preamplifier 11, the frequency response characteristic of which is drawn in FIG. 3, showing the output voltage $V_o$ of the amplifier versus frequency $f$ for a constant input voltage. Amplifier 11 is, as is per se known to the art, connected to a gain-control unit 12 for controlling the gain of the amplifier channel extending from the output circuit of the transducer 9 to the recording means 14 of the recording instrument, the gain-control unit 12 being any AVC type tube with signal input, signal output and gain control and having controllable by means of a direct-current control voltage applied to a control-voltage input lead 13, said control voltage in a device according to the invention being provided for in a manner more fully described below. The simplest form of a gain-control unit 12 is an AVC or "variable gain" tube such as that described on pages 7 – 12 of *Electrical Engineers Handbook*, 4th Edition, John Wiley & Sons.

The recording member 14 of the recording instrument, a mirror galvanometer for instance, for recording signals originating from seismometer 9 after having passed amplifier 11 and gain-control unit 12, is connected to the output lead of the gain-control unit 12.

According to the invention, the control input circuit of the gain-control unit 12 comprises a frequency dependent negative-feedback circuit 15, 16 so designed that an output signal $V_1$, applied to the gain-control unit 12 as a control signal and corresponding to an input signal $V_o$ applied to the input lead of the gain-control unit 12, varies versus frequency of the signal $V_o$ in such a manner that the gain in the signal channel between seismometer 9 and the recording member 14 markedly decreases with increasing frequency, at least and for obvious reasons above a predetermined lowest limit frequency $f_o$. As such, circuits providing a frequency response curve as described are well-known and can easily be designed by those skilled in the art. A gain-control circuit of the general type suitable for use in the present invention is described on pages 440 – 451 with reference to FIG. 49 of *Vacuum-Tube Circuits* by Lawrence Baker Arguimbau, John Wiley & Sons, Inc., New York, 1948.

The voltage $V_o$ appearing on the output lead of the signal channel including amplifier 11 and gain-control unit 12 is thus applied to a circuit generating a control voltage for the gain-control unit 12, said circuit as illustrated comprising amplifier 15 and a rectifier 16, which together have a frequency-response curve such that the control voltage applied to the control input lead 13 of the gain-control unit 12 provides the described frequency response in the transmission of the signal from the seismometer to the recording member.

Figure 4:
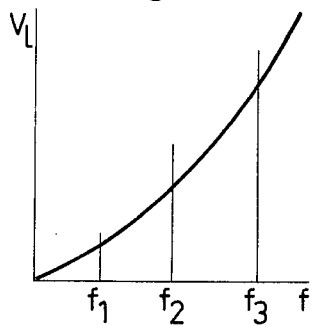
FIG. 4 is a graph showing an example of a frequency response curve of a means to generate a voltage in dependence on the predominant frequency of the signal generated by the transducer, said voltage being utilized to control the amplification of the signal generated by the transducer, as the case may be after amplification in the preamplifier, in dependence on the frequency of the signal.
Figure 5:
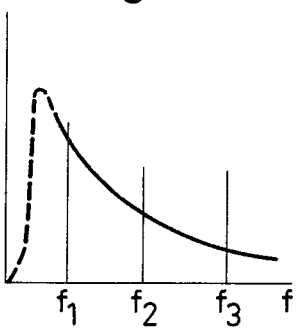
FIG. 5 is an over-all frequency response curve of the device.

FIG. 4 illustrates, by way of example, the output voltage $V_1$ of rectifier 16 versus signal frequency f for a constant input voltage $V_{in}$ to the device from seismometer 9, said voltage $V_1$ thus being applied to the control input lead 13 of the gain-control unit 12. A corresponding frequency response curve of the signal channel from the seismometer to the recording means is illustrated in FIG. 5, showing the voltage $V_o$ versus frequency f for a constant input voltage.

Figure 6:
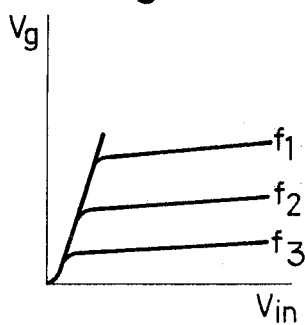
FIG. 6 is a graph showing the measured signal magnitude versus the input voltage as received from a transducer for different frequencies of the input voltage.

FIG. 6 illustrates, by way of example, voltage $V_o$ versus input voltage $V_{in}$ to the device as applied from the output lead of the seismometer for different frequencies $f_1$, $f_2$ and $f_3$, respectively. As is evident from this graph, the voltage applied to the recording member of the recording instrument is, generally speaking, substantially constant for a varying input voltage of one and the same frequency, over a wide input-voltage range, and varying with frequency in such a manner that the voltage applied to the recording member of the instrument increases with decreasing frequency. FIGS. 4 and 5 illustrate how, in accordance with the general principle of the invention, the gain-control voltage $V_1$ and the voltage $V_o$ applied to the recording member, respectively, vary with and correspond to frequencies $f_1$, $f_2$ and $f_3$, respectively, for a particular input voltage $V_{in}$, the gain thus decreasing with increasing gain-control voltage $V_1$.

With a gain control, varying as described with frequency in the signal channels extending between each seismometer and its pertaining recording member of the recording instrument, the amplitude of the recording member, and of the recorded trace therewith, as caused by signals corresponding to interfering ground disturbances, becomes, in general terms, substantially inversely proportional to frequency, as illustrated in FIG. 1. For this reason, the maximal slope of the curves plotted by the recording instrument, as illustrated in FIG. 1 by lines 17, 18 and 19, respectively, is substantially the same for all predominating ground disturbance waves, and this independent of the amplitude of the input voltage $V_{in}$ caused by the ground disturbance waves.

This feature of a device according to the invention substantially facilitates the evaluation of the curves recorded by the instrument. Thus, it is made possible to allow for a substantially higher amplitude of the interference signal level when the frequency is comparatively low, and this is due to the fact that a "slow" variation at a lower frequency than the signal to be actually measured and the critical values of which are to be interpreted does not interfere with the signal-of-interest as recorded.

When the frequency response characteristic of the entire device is so selected, that the recorded amplitude is exactly inversely proportional to frequency, the same maximal slope, 17, 18, and 19, respectively, FIG. 1, for all interference signals would be obtained. Obviously, the result aimed at with the invention is as well attained, although to less extent, even when the frequency response characteristic of the device, and the negative-feed-back in particular, is not accurately inversely proportional to frequency, if only the device is so designed that the gain markedly decreases with increasing frequency.

While the invention has thus been described with reference to a specific embodiment thereof, it is to be understood that various modifications may be made without departing from the scope of the invention. The appended claims are intended to cover any such modifications.

What is claimed is:

1. A device for measuring seismic signals comprising
    a. at least one seismic transducer for generating electric signals representative of seismic ground motion,
    b. a variable-gain amplifier for amplifying said electric signals,
    c. recording means for recording the output signal from said amplifier against time, and
    d. control means for controlling the gain of said amplifier, said control means comprising means for receiving said output signal from said amplifier and for generating in response thereto a gain-control signal having a magnitude which varies with respect to the frequency of the output signal from said amplifier such that the gain of said amplifier and the voltage applied to the recording means decreases with increasing frequency of the electric signals.

2. A device as claimed in claim 1 wherein said control means comprises means causing the output signal of said amplifier applied to said recording instrument to decrease with increasing frequency of the input signal applied to the amplifier and to cause the output signal to remain at a substantially constant value with change in the magnitude of said input signal above a predetermined minimum magnitude.

3. A device as claimed in claim 1 wherein said control means comprises means to generate a gain-control signal which varies substantially inversely in proportion to the frequency above a predetermined lowest frequency of the input signal applied to the amplifier.

4. A device as claimed in claim 1 wherein said control means comprises an amplifier and a rectifier arranged in series.

* * * * *